United States Patent [19]
Laitala

[11] 3,960,220
[45] June 1, 1976

[54] SUBSOIL PLOW
[76] Inventor: Veikko A. Laitala, Rte. 6, Box 215, Rochester, Ind. 46975
[22] Filed: Dec. 9, 1974
[21] Appl. No.: 530,663

[52] U.S. Cl. ............................... 172/261; 172/269; 172/643; 172/657; 172/699; 172/708
[51] Int. Cl.² .................. A01B 61/00; A01B 13/08
[58] Field of Search .......... 172/264, 265, 266, 269, 172/270, 643, 657, 699, 705, 708, 710, 711, 261

[56] References Cited
UNITED STATES PATENTS

| | | | |
|---|---|---|---|
| 503,288 | 8/1893 | Moore | 172/269 |
| 2,712,780 | 7/1955 | Graham | 172/657 |
| 2,935,144 | 5/1960 | Graham | 172/265 |
| 3,431,982 | 3/1969 | Wassill | 172/710 |
| 3,734,201 | 5/1973 | Zaun | 172/711 X |

FOREIGN PATENTS OR APPLICATIONS
613,310    11/1948    United Kingdom................. 172/269

Primary Examiner—Richard C. Pinkham
Assistant Examiner—Richard T. Stouffer

[57] ABSTRACT

This invention relates to a subsoil plow which includes a supporting frame having front and rear sides. A plurality of plow elements are mounted on the frame for pivotable movement on a horizontal axis in a direction fore and aft of the frame. The plow elements are transversely spaced on the frame. Latching means are provided for releasably holding each plow element generally upright in plowing position. Each plow element is spring urged to plowing position whereby forward movement of the plow through the soil may be accompanied by a vibratory pivotal motion thereof.

7 Claims, 9 Drawing Figures

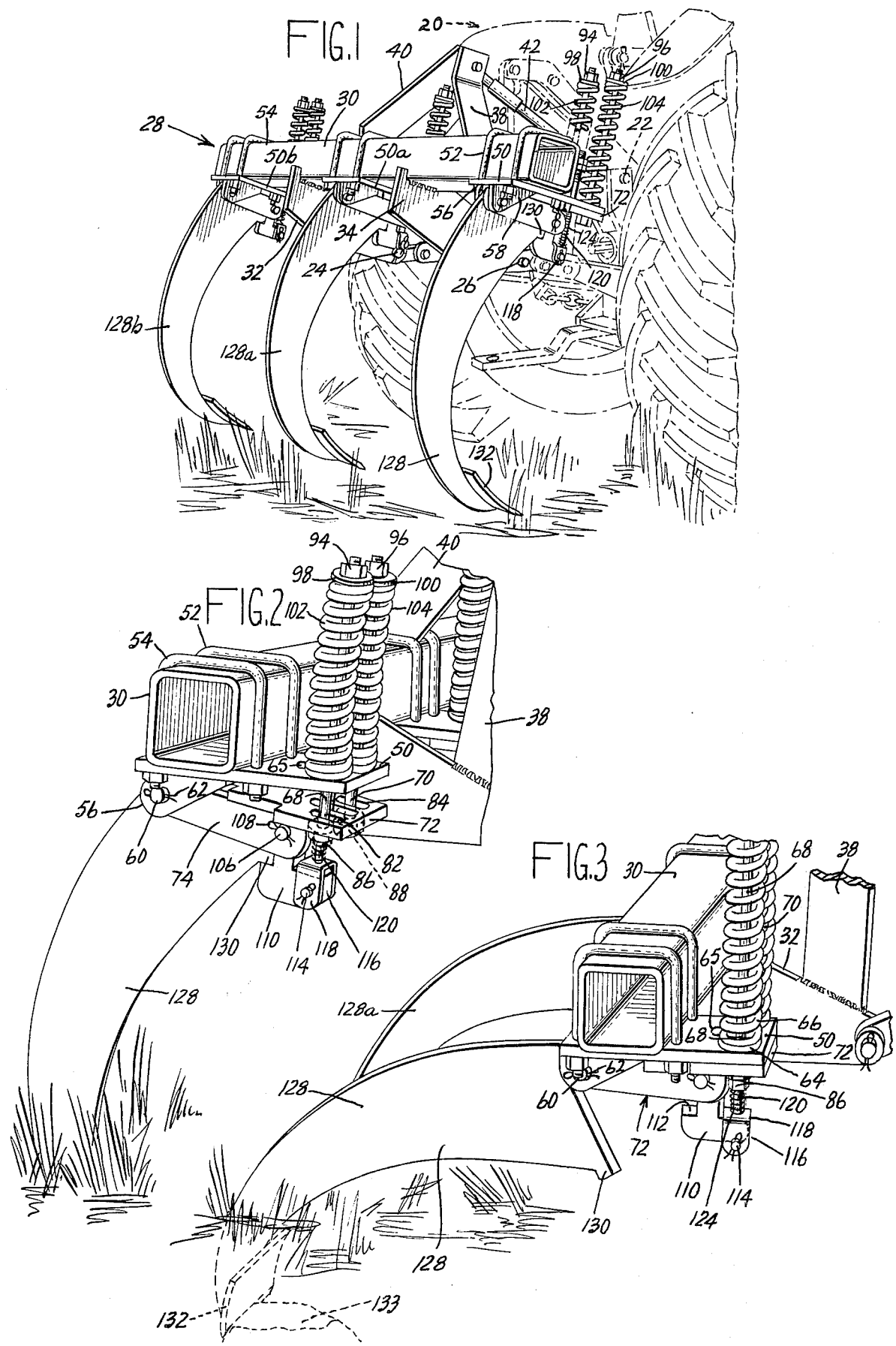

3,960,220

SUBSOIL PLOW

BACKGROUND OF THE INVENTION

1. Field of the Invention

This invention relates to plows and more particularly to a plow for breaking up the subsoil, commonly referred to as plow sole, without unduly disturbing the topsoil.

2. Description of the Prior Art

Plows, and particularly subsoil plows, employ plowing elements that agitate the subsoil. Since such plowing elements deeply penetrate the soil so as to reach the under layer of subsoil, encountering a buried rock or similar obstruction can result in damaging the plow. A problem has existed in the respect of providing adequate breaking and agitation of the subsoil without excessively disturbing the topsoil. Further, prior art plows have required a substantial amount of power in the towing vehicle in order to pull the plow elements through the subsoil. This invention provides a relatively simple plow construction which constitutes an improvement in dealing with these problems.

SUMMARY OF THE INVENTION

This invention relates to a plow apparatus which includes a supporting frame in the form of a tool bar disposed transversely to the direction of plow transport. Plow elements are mounted on the tool bar for pivotable movement about the horizontal axis in a direction fore and aft of the bar. Latches releasably hold the plow elements in generally upright plowing position but may be unlatched to permit the respective plow element to swing rearwardly if an obstruction should be encountered. A spring mechanism is provided yieldably urging each plow element forwardly in its upright plowing position such that normal forward movement of the plow element through the soil is opposed by the spring force in such a manner that the plow element tends to vibrate pivotally as it is drawn through the soil. The vibratory motion thereby imparts an impacting action which tends to break up and shatter hard, packed soils, such as plow sole, hard pan and the like.

It is an object of this invention to provide a subsoil plow which requires a minimum of power in the operation thereof.

It is another object of this invention to provide a subsoil plow which efficiently breaks up and agitates the subsoil without unnecessarily disturbing the topsoil.

It is yet another object of this invention to provide a subsoil plow with plow elements that may vibrate under spring force while being drawn through the soil thereby to more effectively break up and agitate the subsoil.

The above-mentioned and other features and object of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a view in perspective of a preferred embodiment of this invention showing the plow elements prior to entry into the soil;

FIG. 2 is a partial view in perspective of the plow in FIG. 1 with the plow element entering the ground and the hinge plate being pivoted away from the base plate;

FIG. 3 is a view similar to FIG. 2 showing the plow element unlatched from the hinge plate and in an upward position for clearing an underground obstacle;

DESCRIPTION OF THE PREFERRED EMBODIMENT

Figure 4:
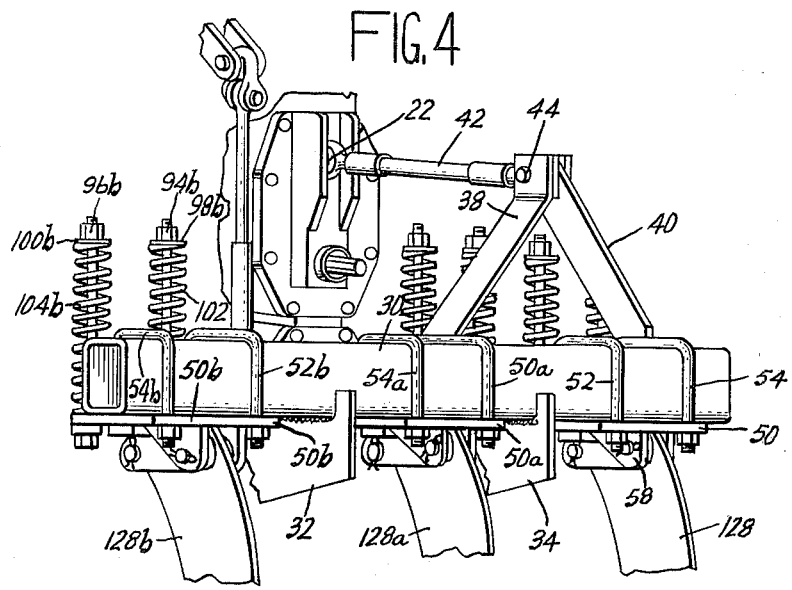
FIG. 4 is a partial view in perspective showing the three point connection of the tool bar to the pulling vehicle.

In FIG. 1 is shown a plow-pulling vehicle 20 in phantom, in this instance a tractor, pivotally connected to subsoil plow 28 of this invention which comprises a tool bar 30, hitch plates 32 and 34, plow shanks 128, 128a and 128b, and supporting structure as described below.

Figure 8:
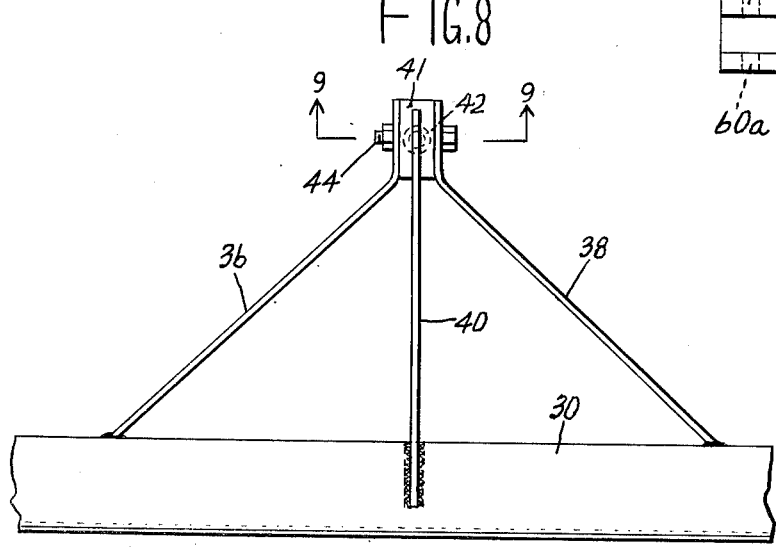
FIG. 8 is a partial view in elevation showing the three supporting braces for the tool.
Figure 9:
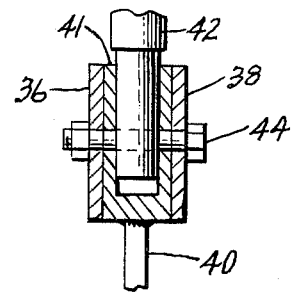
FIG. 9 is a sectional view taken substantially along section line 9—9 of FIG. 8.

Tool bar 30 is a rugged tubular steel beam of square cross section which is supported transversely of plow 28. Spaced hitch plates 32 and 34 are welded to the underside of bar 30 and at their forward ends are pivotally connected at 24 and 26 to lower hitching links, respectively, on the tractor. Angle braces 36 and 38, shown more clearly in FIG. 8, are welded to hitch plates 32 and 34, respectively, (FIGS. 2 and 3) and center brace 40 is welded at one end to the top surface of bar 30 and at the other end to U-shaped member 41 (FIGS. 8 and 9). Braces 36 and 38 are welded at the other ends to member 41 thereby providing a rugged three-point hitch. A hitching link 42 has one end received by the U-shaped member 41 to be pivotally connected thereto by means of a bolt 44. By adjusting the length of link 42, which may be of a turnbuckle construction manipulated by rotating the center portion with a wrench or other tool in one direction to lengthen the link and in the other direction to shorten the link, bar 30 is caused to describe an arc about a horizontal axis parallel to bar 30 which goes through pivot points 24 and 26. In this way, the attitude and depth of the plow elements may be controlled, as will become evident from the description that follows.

Figure 6:
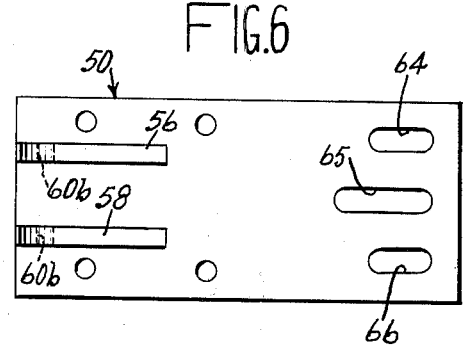
FIG. 6 is a plan view of the bottom of the base plate.

Adjustably secured to tool bar 30 is spaced relation are three base plates 50, 50a and 50b which are identical in construction, base plate 50 being shown in FIG. 6. Base plate 50 is adjustably secured to tool bar 30 by means of U-bolts 52, 54 which pass through base plate 50 and receive nuts which are tightened to secure base plate 50 to tool bar 30. Base plate 50 may be adjusted in position along tool bar 30 by simply loosening the nuts on U-bolts 52, 54 and sliding the base plate to the desired position and then retightening the nuts. In this manner, additional base plates may be added to tool bar 30 and the distance between base plates 50, 50a, and 50b may be adjusted as desired.

Each base plate 50, 50a, and 50b (FIG. 6) has welded thereto to depend therefrom a pair of spaced pivot plates 56 and 58 provided with aligned openings 60b which receive a pivot bolt 60 secured by cotter pins 62 (FIG. 2). Two spaced, elongated openings 64 and 66 at the forward end thereof receive spring biased bolts 68 and 70, respectively, and a third elongated intermediate opening 65 receives a pin 120.

Mounted on pivot bolt 60 is a reaction member or hinge plate 72, (FIG. 7) which comprises pivot supports 74 and 76 welded to hinge plate 72 and having openings which receive pivot pin 60, whereby plate 72 may be swung into flush engagement with plate 50 (FIG. 3) or away therefrom as shown in FIG. 2. Openings 82, 84 in plate 72 receive elongated bolts 68, 70 (FIG. 2), respectively, which are threaded at each end, abutments in the form of nuts 86, 88, being, respectively, received on the lower ends to bear against the unerside of plate 72. Two helical compression springs 102 and 104 telescoped over the bolts 68 and 70, respectively, fit between the base plate 50 and washers 98 and 100 held by nuts 94 and 96, respectively, on the upper ends of the bolts 68 and 70. Springs 102 and 104 are prestressed to urge forcefully hinge plate 72 against base plate 50.

Figure 5:
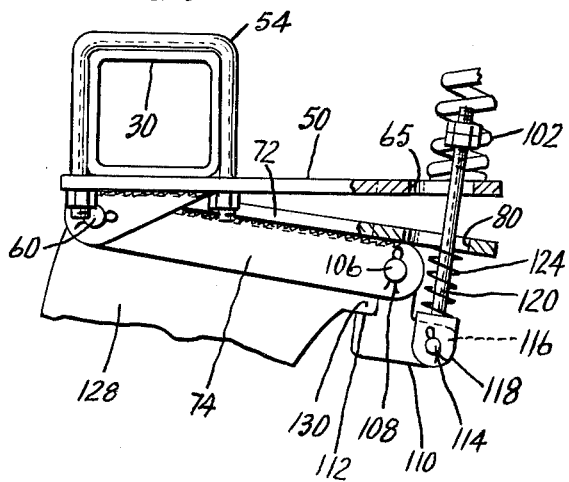
FIG. 5 is a partial side view, partially sectioned, of the base plate and hinge plate with the hinge plate being pivoted away from the base plate.
Figure 7:
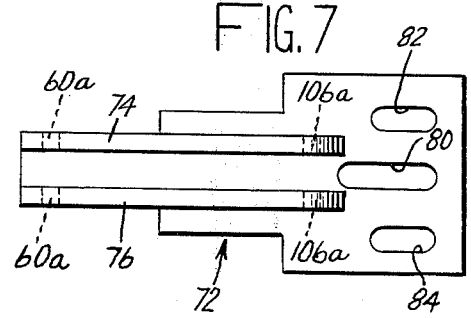
FIG. 7 is a plan view of the bottom of the hinge plate.

As shown in FIGS. 5 and 7, supports 74 and 76 have aligned apertures 106a to receive a pivot pin 106 having cotter pins 108 in the ends thereof. Pivotally mounted on pin 106 intermediate supports 74 and 76 is latch 110 having a latching surface 112 at the rear end thereof. Latch 110 carries pivot pin 114 in arm 116, and U-shaped bracket 118 straddles arm 116 and is pivotally connected to pin 114. Bracket 118 has a guide pin 120 welded thereto which extends through opening 80 in plate 72 and opening 65 in base plate 50. A nut 122 is threaded to the upper end of pin 120. Helical spring 124 surrounding pin 120 forcefully urges bracket 118 in a downwardly direction away from plate 72 and hence tends to rotate latch 110 clockwise about pin 106, as viewed in FIG. 5. This, as will become evident, exerts a latching force.

Pivotally mounted on pin 60, and also positioned between supports 74 and 76 is shank 128 of one plow element which has at its forward end a hardened latching nib 130 engageable with latching surface 112. Shank 128 carries a plate-like shovel 132 on the lower end thereof curved in conformity to the contiguous curvature of the shank. Shank 128 is shown latched in FIGS. 1, 2 and 5 and unlatched in FIG. 3. In the latched position, nib 130 is positioned against latching surface 112 on latching member 110. However, when shank 128 or shovel 132, during forward motion of tractor 20, strikes a rock or other relatively immovable object 133 (FIG. 3) the force of spring 20 and the mechanical leverage on latch 110 is such that the downward force of nib 130 on surface 112 will cause latching member 110 to pivot counterclockwise, as seen in FIG. 3, thereby releasing shank 128 to swing rearwardly over the object. The shanks 128, 128a and 128b are individually operable in this manner and may be relatched by simply causing them to swing forwardly.

The plow of this invention is intended to penetrate and break up the stratum of subsoil beneath the vegetating stratum of topsoil, which commonly is about 4 inches thick and is located from about 8 to 14 inches beneath the surface of the ground. This stratum of subsoil commonly is referred to as hard pan or plow sole. Such hard pan usually is in the form of hard, packed clay which is substantially impermeable to moisture. Thus, rainfall soaking through the topsoil is prevented from penetrating more deeply than the stratum of hard pan. During a period of minimal rainfall, the moisture contained in the top layer of soil eventually evaporates thereby leaving it too dry properly to support plant life. Moisture contained in the soil reaches the roots of growing plants by capillary action; thus, moisture is in essence stored and is available for migration upwardly to the plant roots.

In using the present invention, the individual plow elements 128, 132 are caused to penetrate the stratum of subsoil (hard pan) and to break it up as the plow mechanism is moved forwardly. This stratum is thereby rendered permeable so that moisture may soak through to a lower level. During the growing season, this deeply stored moisture becomes available by capillary action in supporting plant life.

In operation, the plow mechanism is attached to the tractor as described. The attaching link 42 is adjusted in length such that the plow elements 128, 132 will penetrate the ground to a level that will place the points of the shovels 132 just beneath the stratum of subsoil. As the tractor moves forwardly, the plows 132 are forced through the stratum of subsoil breaking it up into chunks and pieces. By reason of the narrow widths of the shanks 128, they will slice through the stratum of topsoil producing only minimal disturbance thereof and minimum resistance to forward motion of the plow.

Resistance encountered by the shovels 132 plowing through the subsoil results in rearward swinging of the shanks 128 about the respective pivot pins 60 against the force of the respective springs 102, 104. As this rearward motion increases, the counteracting forces of the springs 102 and 104 increase until the resistance of the soil against the shovels 132 is overcome thereby resulting in the shanks 128 being forcefully swung forwardly. This movement of the shanks 128 occurs rapidly such that the plow elements 128, 132 are caused to in effect pivotally vibrate. This results in the shovels 132 in effect rapidly impacting and shattering the subsoil, breaking it up into finer pieces and chunks than has heretofore been possible. The subsoil is thereby said to be texturized or conditioned to receive and store moisture for subsequent use by vegetating plants.

If one of the plow elements 128, 132 should encounter a relatively immovable obstruction, such as a large rock, as explained previously, the shank 128 will release from the latch 110 and swing rearwardly until the shovel 132 rides on the surface of the ground (FIG. 3). In order to relatch the shank 128 into operative position, it is only necessary to stop the tractor, back it slightly until the shank 128 is swung forwardly to engage the nib 130 with the latching surface 112. Alternatively, the plow mechanism may be lifted permitting the plow element 128, 132 to swing downwardly under its own weight until the nib 30 engages the latching surface 112.

By reason of the curvature of the shanks 128 and the angulation of the shovels 132, the plow elements 128, 132 may be pulled through the soil with relative ease. This correspondingly reduces the amount of power required of the towing tractor making it possible to utilize smaller tractors that consume smaller amounts of fuel.

This curvature of the shanks 128 and shovels 132 further provide for attacking the soil at an angle to draw the shovels 132 more deeply into the ground and to provide a lifting action on the layer of subsoil. This lifting action in conjunction with the vibratory motion explained above breaks up, shatters and othewise texturizes the subsoil as already explained.

The excursion of vibratory motion on the plow elements 128, 132, while the latter are in latched position, is determined by the extent of movement of the hinge plate 72 from the base plate 50 as limited by the nut on the upper end of the guide pin 120. Downward movement of the plate 72 is limited by the engagement of this nut with the plate 50, this nut serving as a stop.

While there have been described above the principles of this invention in connection with specific apparatus, it is to be clearly understood that this description is made only by way of example and not as a limitation to the scope of the invention.

What is claimed is:

1. Plow apparatus comprising a supporting frame having front and rear sides, a plow element mounted on said frame for pivotal movement about a horizontal axis in a direction fore and aft of said frame, holding means for releasably holding said plow element generally upright in plowing position, means for yieldably pivoting said plow element and holding means forwardly whereby forward movement of said plow element through the soil will be accompanied by vibratory pivotal motion thereof, said yieldable pivoting means including a reaction member mounted on said frame for pivotal movement about said horizontal axis, said holding means being carried by said reaction member whereby said plow element and said reaction member may pivotally vibrate in unison.

2. The plow apparatus of claim 1 in which said yieldable pivoting means includes at least one spring operatively interposed between said reaction member and said supporting frame.

3. The plow apparatus of claim 2 in which said yieldable pivoting means includes a rod having an abutment on one end portion engageable with said reaction member, said spring being a helical spring telescoped over said rod and having a connection with the other end thereof, said helical spring being compressed between a portion of said frame and said other rod end, said abutment engaging a portion of said reaction member juxtaposed to that frame portion engaged by said spring thereby urging said reaction member toward said frame portion.

4. The plow apparatus of claim 3 in which a flat base plate constitutes said frame portion and a flat hinge plate constitutes said reaction member, said hinge plate being pivotable about said axis into flat engagement with said base plate, said plates when engaged extending generally horizontally, both plates having aligned clearance openings that slidably receive said rod in upright position therethrough, said abutment engaging the underside of said hinge plate and said spring engaging the upper side of said base plate, said rod having on the upper end a second abutment engageable by the upper end of said spring whereby said spring urges said rod upwardly which in turn urges said hinge plate into engagement with said base plate, the pivotal mounting of said hinge plate and plow element including a horizontal pivot pin secured to a portion of said frame whereby said hinge plate and said plow element may pivot in unison thereabout.

5. The plow apparatus of claim 4 in which said holding means includes a latch member mounted on and depending from said hinge plate for pivotal movement about a second horizontal axis, said latch member being disposed forwardly of said plow element and having an upwardly facing latch surface juxtaposed and spaced from said hinge plate, said plow element having a forwardly projecting nib that fits in the space between said latching surface and hinge plate for latching said plow element to said hinge plate, and means yieldably urging said latching member into latching engagement with said nib.

6. The plow apparatus of claim 5 in which said supporting frame includes a supporting bar which carries in spaced relation a plurality of the pivoted plow element assemblies which include the aforesaid plates, springs and holding means, and a hitching device connected to said supporting bar for attachment to a towing vehicle, said hitching device includes means for adjusting the angular position of said supporting bar about a pivot disposed forwardly thereof.

7. The apparatus of claim 6 in which said hitching device includes vertically spaced pivot members connected to said supporting bar forwardly thereof, and a generally horizontal linkage member of adjustable length providing the connection between one of said pivot members and said supporting bar.

* * * * *